United States Patent
Yu et al.

(10) Patent No.: US 9,508,363 B1
(45) Date of Patent: Nov. 29, 2016

(54) METHOD FOR FABRICATING A MAGNETIC WRITE POLE HAVING A LEADING EDGE BEVEL

(71) Applicant: Western Digital (Fremont), LLC, Fremont, CA (US)

(72) Inventors: Mingjun Yu, Sunnyvale, CA (US); Donghong Li, Pleasanton, CA (US); Lien-Chang Wang, Fremont, CA (US); Lieping Zhong, San Jose, CA (US); Tao Pan, San Jose, CA (US)

(73) Assignee: WESTERN DIGITAL (FREMONT), LLC, Fremont, CA (US)

( * ) Notice: Subject to any disclaimer, the term of this patent is extended or adjusted under 35 U.S.C. 154(b) by 268 days.

(21) Appl. No.: 14/307,174

(22) Filed: Jun. 17, 2014

(51) Int. Cl.
*G11B 5/127* (2006.01)
*H04R 31/00* (2006.01)

(52) U.S. Cl.
CPC .......... *G11B 5/127* (2013.01); *Y10T 29/49043* (2015.01); *Y10T 29/49052* (2015.01)

(58) Field of Classification Search
CPC ... G11B 5/3116; G11B 5/3163; G11B 5/232; G11B 5/6082; G11B 5/187; G11B 5/2651; G11B 5/8404; Y10T 29/49046; Y10T 29/49048; Y10T 29/49052; Y10T 29/49043
USPC .............. 29/603.07, 603.13, 603.14, 603.15, 29/603.16, 603.18; 216/22, 37, 39; 360/125.02, 125.03, 125.43, 128, 360/235.4, 294.7
See application file for complete search history.

(56) References Cited

U.S. PATENT DOCUMENTS

| | | |
|---|---|---|
| 6,016,290 A | 1/2000 | Chen et al. |
| 6,018,441 A | 1/2000 | Wu et al. |
| 6,025,978 A | 2/2000 | Hoshi et al. |
| 6,025,988 A | 2/2000 | Yan |
| 6,032,353 A | 3/2000 | Hiner et al. |
| 6,033,532 A | 3/2000 | Minami |
| 6,034,851 A | 3/2000 | Zarouri et al. |
| 6,043,959 A | 3/2000 | Crue et al. |
| 6,046,885 A | 4/2000 | Aimonetti et al. |
| 6,049,650 A | 4/2000 | Jerman et al. |
| 6,055,138 A | 4/2000 | Shi |
| 6,058,094 A | 5/2000 | Davis et al. |
| 6,073,338 A | 6/2000 | Liu et al. |
| 6,078,479 A | 6/2000 | Nepela et al. |
| 6,081,499 A | 6/2000 | Berger et al. |
| 6,094,803 A | 8/2000 | Carlson et al. |

(Continued)

*Primary Examiner* — Thiem Phan
(74) *Attorney, Agent, or Firm* — Convergent Law Group LLP

(57) ABSTRACT

A method provides a magnetic transducer having an air-bearing surface (ABS) location. An intermediate layer having a substantially flat bottom surface is provided. A trench is formed in the intermediate layer. The trench is wider in yoke region than in the pole tip region. The trench has a first depth in the yoke region and a second depth less than the first depth in the pole tip region. A portion of the intermediate layer is at the bottom of the trench at the ABS location. A nonmagnetic layer is provided. The nonmagnetic layer fills part of the trench in the pole tip region such that the trench has a third depth less than the second depth at the ABS location. A main pole is provided. The main pole has a leading bevel adjacent to nonmagnetic layer in the portion of the pole tip region of the trench.

12 Claims, 9 Drawing Sheets

(56) References Cited

U.S. PATENT DOCUMENTS

| | | |
|---|---|---|
| 6,099,362 A | 8/2000 | Viches et al. |
| 6,103,073 A | 8/2000 | Thayamballi |
| 6,108,166 A | 8/2000 | Lederman |
| 6,118,629 A | 9/2000 | Huai et al. |
| 6,118,638 A | 9/2000 | Knapp et al. |
| 6,125,018 A | 9/2000 | Takagishi et al. |
| 6,130,779 A | 10/2000 | Carlson et al. |
| 6,134,089 A | 10/2000 | Barr et al. |
| 6,136,166 A | 10/2000 | Shen et al. |
| 6,137,661 A | 10/2000 | Shi et al. |
| 6,137,662 A | 10/2000 | Huai et al. |
| 6,160,684 A | 12/2000 | Heist et al. |
| 6,163,426 A | 12/2000 | Nepela et al. |
| 6,166,891 A | 12/2000 | Lederman et al. |
| 6,173,486 B1 | 1/2001 | Hsiao et al. |
| 6,175,476 B1 | 1/2001 | Huai et al. |
| 6,178,066 B1 | 1/2001 | Barr |
| 6,178,070 B1 | 1/2001 | Hong et al. |
| 6,178,150 B1 | 1/2001 | Davis |
| 6,181,485 B1 | 1/2001 | He |
| 6,181,525 B1 | 1/2001 | Carlson |
| 6,185,051 B1 | 2/2001 | Chen et al. |
| 6,185,077 B1 | 2/2001 | Tong et al. |
| 6,185,081 B1 | 2/2001 | Simion et al. |
| 6,188,549 B1 | 2/2001 | Wiitala |
| 6,190,764 B1 | 2/2001 | Shi et al. |
| 6,193,584 B1 | 2/2001 | Rudy et al. |
| 6,195,229 B1 | 2/2001 | Shen et al. |
| 6,198,608 B1 | 3/2001 | Hong et al. |
| 6,198,609 B1 | 3/2001 | Barr et al. |
| 6,201,673 B1 | 3/2001 | Rottmayer et al. |
| 6,204,998 B1 | 3/2001 | Katz |
| 6,204,999 B1 | 3/2001 | Crue et al. |
| 6,212,153 B1 | 4/2001 | Chen et al. |
| 6,215,625 B1 | 4/2001 | Carlson |
| 6,219,205 B1 | 4/2001 | Yuan et al. |
| 6,221,218 B1 | 4/2001 | Shi et al. |
| 6,222,707 B1 | 4/2001 | Huai et al. |
| 6,229,782 B1 | 5/2001 | Wang et al. |
| 6,230,959 B1 | 5/2001 | Heist et al. |
| 6,233,116 B1 | 5/2001 | Chen et al. |
| 6,233,125 B1 | 5/2001 | Knapp et al. |
| 6,237,215 B1 | 5/2001 | Hunsaker et al. |
| 6,252,743 B1 | 6/2001 | Bozorgi |
| 6,255,721 B1 | 7/2001 | Roberts |
| 6,258,468 B1 | 7/2001 | Mahvan et al. |
| 6,266,216 B1 | 7/2001 | Hikami et al. |
| 6,271,604 B1 | 8/2001 | Frank, Jr. et al. |
| 6,275,354 B1 | 8/2001 | Huai et al. |
| 6,277,505 B1 | 8/2001 | Shi et al. |
| 6,282,056 B1 | 8/2001 | Feng et al. |
| 6,296,955 B1 | 10/2001 | Hossain et al. |
| 6,297,955 B1 | 10/2001 | Frank, Jr. et al. |
| 6,304,414 B1 | 10/2001 | Crue, Jr. et al. |
| 6,307,715 B1 | 10/2001 | Berding et al. |
| 6,310,746 B1 | 10/2001 | Hawwa et al. |
| 6,310,750 B1 | 10/2001 | Hawwa et al. |
| 6,317,290 B1 | 11/2001 | Wang et al. |
| 6,317,297 B1 | 11/2001 | Tong et al. |
| 6,322,911 B1 | 11/2001 | Fukagawa et al. |
| 6,330,136 B1 | 12/2001 | Wang et al. |
| 6,330,137 B1 | 12/2001 | Knapp et al. |
| 6,333,830 B2 | 12/2001 | Rose et al. |
| 6,340,533 B1 | 1/2002 | Ueno et al. |
| 6,349,014 B1 | 2/2002 | Crue, Jr. et al. |
| 6,351,355 B1 | 2/2002 | Min et al. |
| 6,353,318 B1 | 3/2002 | Sin et al. |
| 6,353,511 B1 | 3/2002 | Shi et al. |
| 6,356,412 B1 | 3/2002 | Levi et al. |
| 6,359,779 B1 | 3/2002 | Frank, Jr. et al. |
| 6,369,983 B1 | 4/2002 | Hong |
| 6,376,964 B1 | 4/2002 | Young et al. |
| 6,377,535 B1 | 4/2002 | Chen et al. |
| 6,381,095 B1 | 4/2002 | Sin et al. |
| 6,381,105 B1 | 4/2002 | Huai et al. |
| 6,389,499 B1 | 5/2002 | Frank, Jr. et al. |
| 6,392,850 B1 | 5/2002 | Tong et al. |
| 6,396,660 B1 | 5/2002 | Jensen et al. |
| 6,399,179 B1 | 6/2002 | Hanrahan et al. |
| 6,400,526 B2 | 6/2002 | Crue, Jr. et al. |
| 6,404,600 B1 | 6/2002 | Hawwa et al. |
| 6,404,601 B1 | 6/2002 | Rottmayer et al. |
| 6,404,706 B1 | 6/2002 | Stovall et al. |
| 6,410,170 B1 | 6/2002 | Chen et al. |
| 6,411,522 B1 | 6/2002 | Frank, Jr. et al. |
| 6,417,998 B1 | 7/2002 | Crue, Jr. et al. |
| 6,417,999 B1 | 7/2002 | Knapp et al. |
| 6,418,000 B1 | 7/2002 | Gibbons et al. |
| 6,418,048 B1 | 7/2002 | Sin et al. |
| 6,421,211 B1 | 7/2002 | Hawwa et al. |
| 6,421,212 B1 | 7/2002 | Gibbons et al. |
| 6,424,505 B1 | 7/2002 | Lam et al. |
| 6,424,507 B1 | 7/2002 | Lederman et al. |
| 6,430,009 B1 | 8/2002 | Komaki et al. |
| 6,430,806 B1 | 8/2002 | Chen et al. |
| 6,433,965 B1 | 8/2002 | Gopinathan et al. |
| 6,433,968 B1 | 8/2002 | Shi et al. |
| 6,433,970 B1 | 8/2002 | Knapp et al. |
| 6,437,945 B1 | 8/2002 | Hawwa et al. |
| 6,445,536 B1 | 9/2002 | Rudy et al. |
| 6,445,542 B1 | 9/2002 | Levi et al. |
| 6,445,553 B2 | 9/2002 | Barr et al. |
| 6,445,554 B1 | 9/2002 | Dong et al. |
| 6,447,935 B1 | 9/2002 | Zhang et al. |
| 6,448,765 B1 | 9/2002 | Chen et al. |
| 6,451,514 B1 | 9/2002 | Iitsuka |
| 6,452,742 B1 | 9/2002 | Crue et al. |
| 6,452,765 B1 | 9/2002 | Mahvan et al. |
| 6,456,465 B1 | 9/2002 | Louis et al. |
| 6,459,552 B1 | 10/2002 | Liu et al. |
| 6,462,920 B1 | 10/2002 | Karimi |
| 6,466,401 B1 | 10/2002 | Hong et al. |
| 6,466,402 B1 | 10/2002 | Crue, Jr. et al. |
| 6,466,404 B1 | 10/2002 | Crue, Jr. et al. |
| 6,468,436 B1 | 10/2002 | Shi et al. |
| 6,469,877 B1 | 10/2002 | Knapp et al. |
| 6,477,019 B2 | 11/2002 | Matono et al. |
| 6,479,096 B1 | 11/2002 | Shi et al. |
| 6,483,662 B1 | 11/2002 | Thomas et al. |
| 6,487,040 B1 | 11/2002 | Hsiao et al. |
| 6,487,056 B1 | 11/2002 | Gibbons et al. |
| 6,490,125 B1 | 12/2002 | Barr |
| 6,496,330 B1 | 12/2002 | Crue, Jr. et al. |
| 6,496,334 B1 | 12/2002 | Pang et al. |
| 6,504,676 B1 | 1/2003 | Hiner et al. |
| 6,512,657 B2 | 1/2003 | Heist et al. |
| 6,512,659 B1 | 1/2003 | Hawwa et al. |
| 6,512,661 B1 | 1/2003 | Louis |
| 6,512,690 B1 | 1/2003 | Qi et al. |
| 6,515,573 B1 | 2/2003 | Dong et al. |
| 6,515,791 B1 | 2/2003 | Hawwa et al. |
| 6,532,823 B1 | 3/2003 | Knapp et al. |
| 6,535,363 B1 | 3/2003 | Hosomi et al. |
| 6,552,874 B1 | 4/2003 | Chen et al. |
| 6,552,928 B1 | 4/2003 | Qi et al. |
| 6,577,470 B1 | 6/2003 | Rumpler |
| 6,583,961 B2 | 6/2003 | Levi et al. |
| 6,583,968 B1 | 6/2003 | Scura et al. |
| 6,597,548 B1 | 7/2003 | Yamanaka et al. |
| 6,611,398 B1 | 8/2003 | Rumpler et al. |
| 6,618,223 B1 | 9/2003 | Chen et al. |
| 6,629,357 B1 | 10/2003 | Akoh |
| 6,633,464 B2 | 10/2003 | Lai et al. |
| 6,636,394 B1 | 10/2003 | Fukagawa et al. |
| 6,639,291 B1 | 10/2003 | Sin et al. |
| 6,650,503 B1 | 11/2003 | Chen et al. |
| 6,650,506 B1 | 11/2003 | Risse |
| 6,654,195 B1 | 11/2003 | Frank, Jr. et al. |
| 6,657,816 B1 | 12/2003 | Barr et al. |
| 6,661,621 B1 | 12/2003 | Iitsuka |
| 6,661,625 B1 | 12/2003 | Sin et al. |
| 6,674,610 B1 | 1/2004 | Thomas et al. |
| 6,680,863 B1 | 1/2004 | Shi et al. |
| 6,683,763 B1 | 1/2004 | Hiner et al. |

(56) References Cited

U.S. PATENT DOCUMENTS

| | | |
|---|---|---|
| 6,687,098 B1 | 2/2004 | Huai |
| 6,687,178 B1 | 2/2004 | Qi et al. |
| 6,687,977 B2 | 2/2004 | Knapp et al. |
| 6,691,226 B1 | 2/2004 | Frank, Jr. et al. |
| 6,697,294 B1 | 2/2004 | Qi et al. |
| 6,700,738 B1 | 3/2004 | Sin et al. |
| 6,700,759 B1 | 3/2004 | Knapp et al. |
| 6,704,158 B2 | 3/2004 | Hawwa et al. |
| 6,707,083 B1 | 3/2004 | Hiner et al. |
| 6,713,801 B1 | 3/2004 | Sin et al. |
| 6,721,138 B1 | 4/2004 | Chen et al. |
| 6,721,149 B1 | 4/2004 | Shi et al. |
| 6,721,203 B1 | 4/2004 | Qi et al. |
| 6,724,569 B1 | 4/2004 | Chen et al. |
| 6,724,572 B1 | 4/2004 | Stoev et al. |
| 6,729,015 B2 | 5/2004 | Matono et al. |
| 6,735,850 B1 | 5/2004 | Gibbons et al. |
| 6,737,281 B1 | 5/2004 | Dang et al. |
| 6,744,608 B1 | 6/2004 | Sin et al. |
| 6,747,301 B1 | 6/2004 | Hiner et al. |
| 6,751,055 B1 | 6/2004 | Alfoqaha et al. |
| 6,754,049 B1 | 6/2004 | Seagle et al. |
| 6,756,071 B1 | 6/2004 | Shi et al. |
| 6,757,140 B1 | 6/2004 | Hawwa |
| 6,760,196 B1 | 7/2004 | Niu et al. |
| 6,762,910 B1 | 7/2004 | Knapp et al. |
| 6,765,756 B1 | 7/2004 | Hong et al. |
| 6,775,902 B1 | 8/2004 | Huai et al. |
| 6,778,358 B1 | 8/2004 | Jiang et al. |
| 6,781,927 B1 | 8/2004 | Heanuc et al. |
| 6,785,955 B1 | 9/2004 | Chen et al. |
| 6,791,793 B1 | 9/2004 | Chen et al. |
| 6,791,807 B1 | 9/2004 | Hikami et al. |
| 6,798,616 B1 | 9/2004 | Seagle et al. |
| 6,798,625 B1 | 9/2004 | Ueno et al. |
| 6,801,408 B1 | 10/2004 | Chen et al. |
| 6,801,411 B1 | 10/2004 | Lederman et al. |
| 6,803,615 B1 | 10/2004 | Sin et al. |
| 6,806,035 B1 | 10/2004 | Atireklapvarodom et al. |
| 6,807,030 B1 | 10/2004 | Hawwa et al. |
| 6,807,332 B1 | 10/2004 | Hawwa |
| 6,809,899 B1 | 10/2004 | Chen et al. |
| 6,816,345 B1 | 11/2004 | Knapp et al. |
| 6,828,897 B1 | 12/2004 | Nepela |
| 6,829,160 B1 | 12/2004 | Qi et al. |
| 6,829,819 B1 | 12/2004 | Crue, Jr. et al. |
| 6,833,979 B1 | 12/2004 | Knapp et al. |
| 6,834,010 B1 | 12/2004 | Qi et al. |
| 6,859,343 B1 | 2/2005 | Alfoqaha et al. |
| 6,859,997 B1 | 3/2005 | Tong et al. |
| 6,861,937 B1 | 3/2005 | Feng et al. |
| 6,870,712 B2 | 3/2005 | Chen et al. |
| 6,873,494 B2 | 3/2005 | Chen et al. |
| 6,873,547 B1 | 3/2005 | Shi et al. |
| 6,879,464 B2 | 4/2005 | Sun et al. |
| 6,888,184 B1 | 5/2005 | Shi et al. |
| 6,888,704 B1 | 5/2005 | Diao et al. |
| 6,891,702 B1 | 5/2005 | Tang |
| 6,894,871 B2 | 5/2005 | Alfoqaha et al. |
| 6,894,877 B1 | 5/2005 | Crue, Jr. et al. |
| 6,906,894 B2 | 6/2005 | Chen et al. |
| 6,909,578 B1 | 6/2005 | Missell et al. |
| 6,912,106 B1 | 6/2005 | Chen et al. |
| 6,934,113 B1 | 8/2005 | Chen |
| 6,934,129 B1 | 8/2005 | Zhang et al. |
| 6,940,688 B2 | 9/2005 | Jiang et al. |
| 6,942,824 B1 | 9/2005 | Li |
| 6,943,993 B2 | 9/2005 | Chang et al. |
| 6,944,938 B1 | 9/2005 | Crue, Jr. et al. |
| 6,947,258 B1 | 9/2005 | Li |
| 6,950,266 B1 | 9/2005 | McCaslin et al. |
| 6,954,332 B1 | 10/2005 | Hong et al. |
| 6,958,885 B1 | 10/2005 | Chen et al. |
| 6,961,221 B1 | 11/2005 | Niu et al. |
| 6,969,989 B1 | 11/2005 | Mei |
| 6,975,486 B2 | 12/2005 | Chen et al. |
| 6,987,643 B1 | 1/2006 | Seagle |
| 6,989,962 B1 | 1/2006 | Dong et al. |
| 6,989,972 B1 | 1/2006 | Stoev et al. |
| 7,006,327 B2 | 2/2006 | Krounbi et al. |
| 7,007,372 B1 | 3/2006 | Chen et al. |
| 7,012,832 B1 | 3/2006 | Sin et al. |
| 7,023,658 B1 | 4/2006 | Knapp et al. |
| 7,026,063 B2 | 4/2006 | Ueno et al. |
| 7,027,268 B1 | 4/2006 | Zhu et al. |
| 7,027,274 B1 | 4/2006 | Sin et al. |
| 7,035,046 B1 | 4/2006 | Young et al. |
| 7,041,985 B1 | 5/2006 | Wang et al. |
| 7,046,490 B1 | 5/2006 | Ueno et al. |
| 7,054,113 B1 | 5/2006 | Seagle et al. |
| 7,057,857 B1 | 6/2006 | Niu et al. |
| 7,059,868 B1 | 6/2006 | Yan |
| 7,092,195 B1 | 8/2006 | Liu et al. |
| 7,100,266 B2 | 9/2006 | Plumer et al. |
| 7,110,289 B1 | 9/2006 | Sin et al. |
| 7,111,382 B1 | 9/2006 | Knapp et al. |
| 7,113,366 B1 | 9/2006 | Wang et al. |
| 7,114,241 B2 | 10/2006 | Kubota et al. |
| 7,116,517 B1 | 10/2006 | He et al. |
| 7,124,654 B1 | 10/2006 | Davies et al. |
| 7,126,788 B1 | 10/2006 | Liu et al. |
| 7,126,790 B1 | 10/2006 | Liu et al. |
| 7,131,346 B1 | 11/2006 | Buttar et al. |
| 7,133,253 B1 | 11/2006 | Seagle et al. |
| 7,134,185 B1 | 11/2006 | Knapp et al. |
| 7,154,715 B2 | 12/2006 | Yamanaka et al. |
| 7,170,725 B1 | 1/2007 | Zhou et al. |
| 7,177,117 B1 | 2/2007 | Jiang et al. |
| 7,193,815 B1 | 3/2007 | Stoev et al. |
| 7,196,880 B1 | 3/2007 | Anderson et al. |
| 7,199,974 B1 | 4/2007 | Alfoqaha |
| 7,199,975 B1 | 4/2007 | Pan |
| 7,211,339 B1 | 5/2007 | Seagle et al. |
| 7,212,384 B1 | 5/2007 | Stoev et al. |
| 7,238,292 B1 | 7/2007 | He et al. |
| 7,239,478 B1 | 7/2007 | Sin et al. |
| 7,248,431 B1 | 7/2007 | Liu et al. |
| 7,248,433 B1 | 7/2007 | Stoev et al. |
| 7,248,449 B1 | 7/2007 | Seagle |
| 7,253,992 B2 | 8/2007 | Chen et al. |
| 7,280,325 B1 | 10/2007 | Pan |
| 7,283,327 B1 | 10/2007 | Liu et al. |
| 7,284,316 B1 | 10/2007 | Huai et al. |
| 7,286,329 B1 | 10/2007 | Chen et al. |
| 7,289,303 B1 | 10/2007 | Sin et al. |
| 7,292,409 B1 | 11/2007 | Stoev et al. |
| 7,296,339 B1 | 11/2007 | Yang et al. |
| 7,307,814 B1 | 12/2007 | Seagle et al. |
| 7,307,818 B1 | 12/2007 | Park et al. |
| 7,310,204 B1 | 12/2007 | Stoev et al. |
| 7,318,947 B1 | 1/2008 | Park et al. |
| 7,333,295 B1 | 2/2008 | Medina et al. |
| 7,337,530 B1 | 3/2008 | Stoev et al. |
| 7,342,752 B1 | 3/2008 | Zhang et al. |
| 7,349,170 B1 | 3/2008 | Rudman et al. |
| 7,349,179 B1 | 3/2008 | He et al. |
| 7,354,664 B1 | 4/2008 | Jiang et al. |
| 7,363,697 B1 | 4/2008 | Dunn et al. |
| 7,371,152 B1 | 5/2008 | Newman |
| 7,372,665 B1 | 5/2008 | Stoev et al. |
| 7,375,926 B1 | 5/2008 | Stoev et al. |
| 7,379,269 B1 | 5/2008 | Krounbi et al. |
| 7,386,933 B1 | 6/2008 | Krounbi et al. |
| 7,389,577 B1 | 6/2008 | Shang et al. |
| 7,417,832 B1 | 8/2008 | Erickson et al. |
| 7,419,891 B1 | 9/2008 | Chen et al. |
| 7,428,124 B1 | 9/2008 | Song et al. |
| 7,430,098 B1 | 9/2008 | Song et al. |
| 7,436,620 B1 | 10/2008 | Kang et al. |
| 7,436,638 B1 | 10/2008 | Pan |
| 7,440,220 B1 | 10/2008 | Kang et al. |
| 7,443,632 B1 | 10/2008 | Stoev et al. |
| 7,444,740 B1 | 11/2008 | Chung et al. |
| 7,493,688 B1 | 2/2009 | Wang et al. |

(56) References Cited

U.S. PATENT DOCUMENTS

| | | |
|---|---|---|
| 7,508,627 B1 | 3/2009 | Zhang et al. |
| 7,509,729 B2 | 3/2009 | Allen et al. |
| 7,522,377 B1 | 4/2009 | Jiang et al. |
| 7,522,379 B1 | 4/2009 | Krounbi et al. |
| 7,522,382 B1 | 4/2009 | Pan |
| 7,542,246 B1 | 6/2009 | Song et al. |
| 7,551,406 B1 | 6/2009 | Thomas et al. |
| 7,552,523 B1 | 6/2009 | He et al. |
| 7,554,767 B1 | 6/2009 | Hu et al. |
| 7,583,466 B2 | 9/2009 | Kermiche et al. |
| 7,595,967 B1 | 9/2009 | Moon et al. |
| 7,639,457 B1 | 12/2009 | Chen et al. |
| 7,660,080 B1 | 2/2010 | Liu et al. |
| 7,672,080 B1 | 3/2010 | Tang et al. |
| 7,672,086 B1 | 3/2010 | Jiang |
| 7,684,160 B1 | 3/2010 | Erickson et al. |
| 7,688,546 B1 | 3/2010 | Bai et al. |
| 7,691,434 B1 | 4/2010 | Zhang et al. |
| 7,695,761 B1 | 4/2010 | Shen et al. |
| 7,719,795 B2 | 5/2010 | Hu et al. |
| 7,726,009 B1 | 6/2010 | Liu et al. |
| 7,729,086 B1 | 6/2010 | Song et al. |
| 7,729,087 B1 | 6/2010 | Stoev et al. |
| 7,736,823 B1 | 6/2010 | Wang et al. |
| 7,785,666 B1 | 8/2010 | Sun et al. |
| 7,796,356 B1 | 9/2010 | Fowler et al. |
| 7,800,858 B1 | 9/2010 | Bajikar et al. |
| 7,819,979 B1 | 10/2010 | Chen et al. |
| 7,829,264 B1 | 11/2010 | Wang et al. |
| 7,841,068 B2 | 11/2010 | Chen et al. |
| 7,846,643 B1 | 12/2010 | Sun et al. |
| 7,855,854 B2 | 12/2010 | Hu et al. |
| 7,869,160 B1 | 1/2011 | Pan et al. |
| 7,872,824 B1 | 1/2011 | Macchioni et al. |
| 7,872,833 B2 | 1/2011 | Hu et al. |
| 7,910,267 B1 | 3/2011 | Zeng et al. |
| 7,911,735 B1 | 3/2011 | Sin et al. |
| 7,911,737 B1 | 3/2011 | Jiang et al. |
| 7,916,426 B2 | 3/2011 | Hu et al. |
| 7,918,013 B1 | 4/2011 | Dunn et al. |
| 7,968,219 B1 | 6/2011 | Jiang et al. |
| 7,982,989 B1 | 7/2011 | Shi et al. |
| 8,008,912 B1 | 8/2011 | Shang |
| 8,012,804 B1 | 9/2011 | Wang et al. |
| 8,015,692 B1 | 9/2011 | Zhang et al. |
| 8,018,677 B1 | 9/2011 | Chung et al. |
| 8,018,678 B1 | 9/2011 | Zhang et al. |
| 8,024,748 B1 | 9/2011 | Moravec et al. |
| 8,072,705 B1 | 12/2011 | Wang et al. |
| 8,074,345 B1 | 12/2011 | Anguelouch et al. |
| 8,077,418 B1 | 12/2011 | Hu et al. |
| 8,077,434 B1 | 12/2011 | Shen et al. |
| 8,077,435 B1 | 12/2011 | Liu et al. |
| 8,077,557 B1 | 12/2011 | Hu et al. |
| 8,079,135 B1 | 12/2011 | Shen et al. |
| 8,081,403 B1 | 12/2011 | Chen et al. |
| 8,091,210 B1 | 1/2012 | Sasaki et al. |
| 8,097,846 B1 | 1/2012 | Anguelouch et al. |
| 8,104,166 B1 | 1/2012 | Zhang et al. |
| 8,116,043 B2 | 2/2012 | Leng et al. |
| 8,116,171 B1 | 2/2012 | Lee |
| 8,125,856 B1 | 2/2012 | Li et al. |
| 8,134,794 B1 | 3/2012 | Wang |
| 8,136,224 B1 | 3/2012 | Sun et al. |
| 8,136,225 B1 | 3/2012 | Zhang et al. |
| 8,136,805 B1 | 3/2012 | Lee |
| 8,141,235 B1 | 3/2012 | Zhang |
| 8,146,236 B1 | 4/2012 | Luo et al. |
| 8,149,536 B1 | 4/2012 | Yang et al. |
| 8,151,441 B1 | 4/2012 | Rudy et al. |
| 8,163,185 B1 | 4/2012 | Sun et al. |
| 8,164,760 B2 | 4/2012 | Willis |
| 8,164,855 B1 | 4/2012 | Gibbons et al. |
| 8,164,864 B2 | 4/2012 | Kaiser et al. |
| 8,165,709 B1 | 4/2012 | Rudy |
| 8,166,631 B1 | 5/2012 | Tran et al. |
| 8,166,632 B1 | 5/2012 | Zhang et al. |
| 8,169,473 B1 | 5/2012 | Yu et al. |
| 8,171,618 B1 | 5/2012 | Wang et al. |
| 8,179,636 B1 | 5/2012 | Bai et al. |
| 8,191,237 B1 | 6/2012 | Luo et al. |
| 8,194,365 B1 | 6/2012 | Leng et al. |
| 8,194,366 B1 | 6/2012 | Li et al. |
| 8,196,285 B1 | 6/2012 | Zhang et al. |
| 8,200,054 B1 | 6/2012 | Li et al. |
| 8,203,800 B2 | 6/2012 | Li et al. |
| 8,208,350 B1 | 6/2012 | Hu et al. |
| 8,220,140 B1 | 7/2012 | Wang et al. |
| 8,222,599 B1 | 7/2012 | Chien |
| 8,225,488 B1 | 7/2012 | Zhang et al. |
| 8,227,023 B1 | 7/2012 | Liu et al. |
| 8,228,633 B1 | 7/2012 | Tran et al. |
| 8,231,796 B1 | 7/2012 | Li et al. |
| 8,233,248 B1 | 7/2012 | Li et al. |
| 8,248,896 B1 | 8/2012 | Yuan et al. |
| 8,254,060 B1 | 8/2012 | Shi et al. |
| 8,257,597 B1 | 9/2012 | Guan et al. |
| 8,259,410 B1 | 9/2012 | Bai et al. |
| 8,259,539 B1 | 9/2012 | Hu et al. |
| 8,262,918 B1 | 9/2012 | Li et al. |
| 8,262,919 B1 | 9/2012 | Luo et al. |
| 8,264,797 B2 | 9/2012 | Emley |
| 8,264,798 B1 | 9/2012 | Guan et al. |
| 8,270,126 B1 | 9/2012 | Roy et al. |
| 8,276,258 B1 | 10/2012 | Tran et al. |
| 8,277,669 B1 | 10/2012 | Chen et al. |
| 8,279,719 B1 | 10/2012 | Hu et al. |
| 8,284,517 B1 | 10/2012 | Sun et al. |
| 8,288,204 B1 | 10/2012 | Wang et al. |
| 8,289,821 B1 | 10/2012 | Huber |
| 8,291,743 B1 | 10/2012 | Shi et al. |
| 8,307,539 B1 | 11/2012 | Rudy et al. |
| 8,307,540 B1 | 11/2012 | Tran et al. |
| 8,308,921 B1 | 11/2012 | Hiner et al. |
| 8,310,785 B1 | 11/2012 | Zhang et al. |
| 8,310,901 B1 | 11/2012 | Batra et al. |
| 8,315,019 B1 | 11/2012 | Mao et al. |
| 8,316,527 B2 | 11/2012 | Hong et al. |
| 8,320,076 B1 | 11/2012 | Shen et al. |
| 8,320,077 B1 | 11/2012 | Tang et al. |
| 8,320,219 B1 | 11/2012 | Wolf et al. |
| 8,320,220 B1 | 11/2012 | Yuan et al. |
| 8,320,722 B1 | 11/2012 | Yuan et al. |
| 8,322,022 B1 | 12/2012 | Yi et al. |
| 8,322,023 B1 | 12/2012 | Zeng et al. |
| 8,323,727 B2 | 12/2012 | Pentek et al. |
| 8,325,569 B1 | 12/2012 | Shi et al. |
| 8,333,008 B1 | 12/2012 | Sin et al. |
| 8,334,093 B2 | 12/2012 | Zhang et al. |
| 8,336,194 B2 | 12/2012 | Yuan et al. |
| 8,339,738 B1 | 12/2012 | Tran et al. |
| 8,341,826 B1 | 1/2013 | Jiang et al. |
| 8,343,319 B1 | 1/2013 | Li et al. |
| 8,343,364 B1 | 1/2013 | Gao et al. |
| 8,349,195 B1 | 1/2013 | Si et al. |
| 8,351,307 B1 | 1/2013 | Wolf et al. |
| 8,357,244 B1 | 1/2013 | Zhao et al. |
| 8,373,945 B1 | 2/2013 | Luo et al. |
| 8,375,564 B1 | 2/2013 | Luo et al. |
| 8,375,565 B2 | 2/2013 | Hu et al. |
| 8,381,391 B2 | 2/2013 | Park et al. |
| 8,385,157 B1 | 2/2013 | Champion et al. |
| 8,385,158 B1 | 2/2013 | Hu et al. |
| 8,394,280 B1 | 3/2013 | Wan et al. |
| 8,400,731 B1 | 3/2013 | Li et al. |
| 8,404,128 B1 | 3/2013 | Zhang et al. |
| 8,404,129 B1 | 3/2013 | Luo et al. |
| 8,405,930 B1 | 3/2013 | Li et al. |
| 8,409,453 B1 | 4/2013 | Jiang et al. |
| 8,413,317 B1 | 4/2013 | Wan et al. |
| 8,416,540 B1 | 4/2013 | Li et al. |
| 8,419,953 B1 | 4/2013 | Su et al. |
| 8,419,954 B1 | 4/2013 | Chen et al. |
| 8,422,176 B1 | 4/2013 | Leng et al. |

(56) References Cited

U.S. PATENT DOCUMENTS

| | | |
|---|---|---|
| 8,422,342 B1 | 4/2013 | Lee |
| 8,422,841 B1 | 4/2013 | Shi et al. |
| 8,424,192 B1 | 4/2013 | Yang et al. |
| 8,441,756 B1 | 5/2013 | Sun et al. |
| 8,443,510 B1 | 5/2013 | Shi et al. |
| 8,444,866 B1 | 5/2013 | Guan et al. |
| 8,449,948 B2 | 5/2013 | Medina et al. |
| 8,451,556 B1 | 5/2013 | Wang et al. |
| 8,451,563 B1 | 5/2013 | Zhang et al. |
| 8,454,846 B1 | 6/2013 | Zhou et al. |
| 8,455,119 B1 | 6/2013 | Jiang et al. |
| 8,456,961 B1 | 6/2013 | Wang et al. |
| 8,456,963 B1 | 6/2013 | Hu et al. |
| 8,456,964 B1 | 6/2013 | Yuan et al. |
| 8,456,966 B1 | 6/2013 | Shi et al. |
| 8,456,967 B1 | 6/2013 | Mallary |
| 8,458,892 B2 | 6/2013 | Si et al. |
| 8,462,592 B1 | 6/2013 | Wolf et al. |
| 8,468,682 B1 | 6/2013 | Zhang |
| 8,472,288 B1 | 6/2013 | Wolf et al. |
| 8,480,911 B1 | 7/2013 | Osugi et al. |
| 8,486,285 B2 | 7/2013 | Zhou et al. |
| 8,486,286 B1 | 7/2013 | Gao et al. |
| 8,488,272 B1 | 7/2013 | Tran et al. |
| 8,491,801 B1 | 7/2013 | Tanner et al. |
| 8,491,802 B1 | 7/2013 | Gao et al. |
| 8,493,693 B1 | 7/2013 | Zheng et al. |
| 8,493,695 B1 | 7/2013 | Kaiser et al. |
| 8,495,813 B1 | 7/2013 | Hu et al. |
| 8,498,084 B1 | 7/2013 | Leng et al. |
| 8,506,828 B1 | 8/2013 | Osugi et al. |
| 8,514,517 B1 | 8/2013 | Batra et al. |
| 8,518,279 B1 | 8/2013 | Wang et al. |
| 8,518,832 B1 | 8/2013 | Yang et al. |
| 8,520,336 B1 | 8/2013 | Liu et al. |
| 8,520,337 B1 | 8/2013 | Liu et al. |
| 8,524,068 B2 | 9/2013 | Medina et al. |
| 8,526,275 B1 | 9/2013 | Yuan et al. |
| 8,531,801 B1 | 9/2013 | Xiao et al. |
| 8,532,450 B1 | 9/2013 | Wang et al. |
| 8,533,937 B1 | 9/2013 | Wang et al. |
| 8,537,494 B1 | 9/2013 | Pan et al. |
| 8,537,495 B1 | 9/2013 | Luo et al. |
| 8,537,502 B1 | 9/2013 | Park et al. |
| 8,545,999 B1 | 10/2013 | Leng et al. |
| 8,547,659 B1 | 10/2013 | Bai et al. |
| 8,547,667 B1 | 10/2013 | Roy et al. |
| 8,547,730 B1 | 10/2013 | Shen et al. |
| 8,555,486 B1 | 10/2013 | Medina et al. |
| 8,559,141 B1 | 10/2013 | Pakala et al. |
| 8,563,146 B1 | 10/2013 | Zhang et al. |
| 8,565,049 B1 | 10/2013 | Tanner et al. |
| 8,576,517 B1 | 11/2013 | Tran et al. |
| 8,578,594 B2 | 11/2013 | Jiang et al. |
| 8,582,238 B1 | 11/2013 | Liu et al. |
| 8,582,241 B1 | 11/2013 | Yu et al. |
| 8,582,253 B1 | 11/2013 | Zheng et al. |
| 8,588,039 B1 | 11/2013 | Shi et al. |
| 8,593,914 B2 | 11/2013 | Wang et al. |
| 8,597,528 B1 | 12/2013 | Roy et al. |
| 8,599,520 B1 | 12/2013 | Liu et al. |
| 8,599,657 B1 | 12/2013 | Lee |
| 8,603,593 B1 | 12/2013 | Roy et al. |
| 8,607,438 B1 | 12/2013 | Gao et al. |
| 8,607,439 B1 | 12/2013 | Wang et al. |
| 8,611,035 B1 | 12/2013 | Bajikar et al. |
| 8,611,054 B1 | 12/2013 | Shang et al. |
| 8,611,055 B1 | 12/2013 | Pakala et al. |
| 8,614,864 B1 | 12/2013 | Hong et al. |
| 8,619,512 B1 | 12/2013 | Yuan et al. |
| 8,625,233 B1 | 1/2014 | Ji et al. |
| 8,625,941 B1 | 1/2014 | Shi et al. |
| 8,628,672 B1 | 1/2014 | Si et al. |
| 8,630,068 B1 | 1/2014 | Mauri et al. |
| 8,634,280 B1 | 1/2014 | Wang et al. |
| 8,638,529 B1 | 1/2014 | Leng et al. |
| 8,643,980 B1 | 2/2014 | Fowler et al. |
| 8,649,123 B1 | 2/2014 | Zhang et al. |
| 8,665,561 B1 | 3/2014 | Knutson et al. |
| 8,670,211 B1 | 3/2014 | Sun et al. |
| 8,670,213 B1 | 3/2014 | Zeng et al. |
| 8,670,214 B1 | 3/2014 | Knutson et al. |
| 8,670,294 B1 | 3/2014 | Shi et al. |
| 8,670,295 B1 | 3/2014 | Hu et al. |
| 8,675,318 B1 | 3/2014 | Ho et al. |
| 8,675,455 B1 | 3/2014 | Krichevsky et al. |
| 8,681,594 B1 | 3/2014 | Shi et al. |
| 8,689,430 B1 | 4/2014 | Chen et al. |
| 8,693,141 B1 | 4/2014 | Elliott et al. |
| 8,703,397 B1 | 4/2014 | Zeng et al. |
| 8,705,205 B1 | 4/2014 | Li et al. |
| 8,711,518 B1 | 4/2014 | Zeng et al. |
| 8,711,528 B1 | 4/2014 | Xiao et al. |
| 8,717,709 B1 | 5/2014 | Shi et al. |
| 8,720,044 B1 | 5/2014 | Tran et al. |
| 8,721,902 B1 | 5/2014 | Wang et al. |
| 8,724,259 B1 | 5/2014 | Liu et al. |
| 8,749,790 B1 | 6/2014 | Tanner et al. |
| 8,749,920 B1 | 6/2014 | Knutson et al. |
| 8,753,903 B1 | 6/2014 | Tanner et al. |
| 8,760,807 B1 | 6/2014 | Zhang et al. |
| 8,760,818 B1 | 6/2014 | Diao et al. |
| 8,760,819 B1 | 6/2014 | Liu et al. |
| 8,760,822 B1 | 6/2014 | Li et al. |
| 8,760,823 B1 | 6/2014 | Chen et al. |
| 8,763,235 B1 | 7/2014 | Wang et al. |
| 8,780,498 B1 | 7/2014 | Jiang et al. |
| 8,780,505 B1 | 7/2014 | Xiao |
| 8,786,983 B1 | 7/2014 | Liu et al. |
| 8,790,524 B1 | 7/2014 | Luo et al. |
| 8,790,527 B1 | 7/2014 | Luo et al. |
| 8,792,208 B1 | 7/2014 | Liu et al. |
| 8,792,312 B1 | 7/2014 | Wang et al. |
| 8,793,866 B1 | 8/2014 | Zhang et al. |
| 8,797,680 B1 | 8/2014 | Luo et al. |
| 8,797,684 B1 | 8/2014 | Tran et al. |
| 8,797,686 B1 | 8/2014 | Bai et al. |
| 8,797,692 B1 | 8/2014 | Guo et al. |
| 8,813,324 B2 | 8/2014 | Emley et al. |
| 2010/0290157 A1 | 11/2010 | Zhang et al. |
| 2011/0086240 A1 | 4/2011 | Xiang et al. |
| 2012/0111826 A1 | 5/2012 | Chen et al. |
| 2012/0216378 A1 | 8/2012 | Emley et al. |
| 2012/0237878 A1 | 9/2012 | Zeng et al. |
| 2012/0298621 A1 | 11/2012 | Gao |
| 2013/0216702 A1 | 8/2013 | Kaiser et al. |
| 2013/0216863 A1 | 8/2013 | Li et al. |
| 2013/0257421 A1 | 10/2013 | Shang et al. |
| 2014/0154529 A1 | 6/2014 | Yang et al. |
| 2014/0175050 A1 | 6/2014 | Zhang et al. |

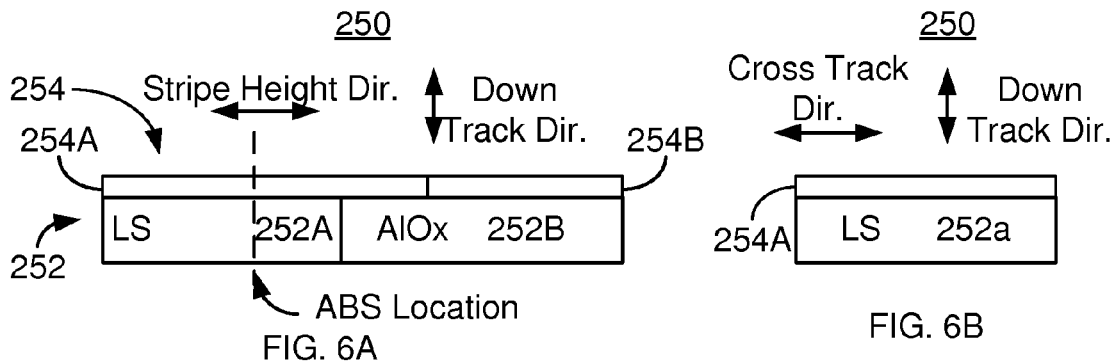
FIG. 6A
FIG. 6B
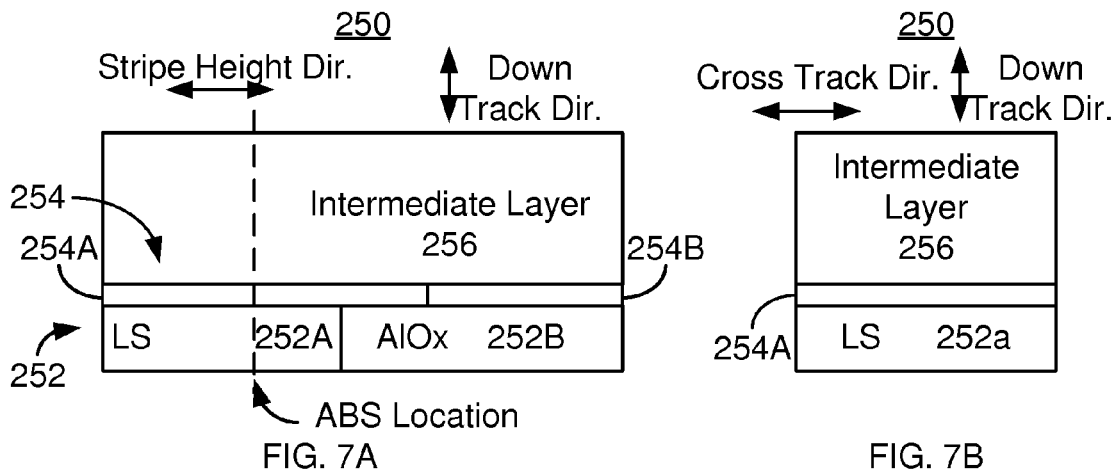
FIG. 7A
FIG. 7B
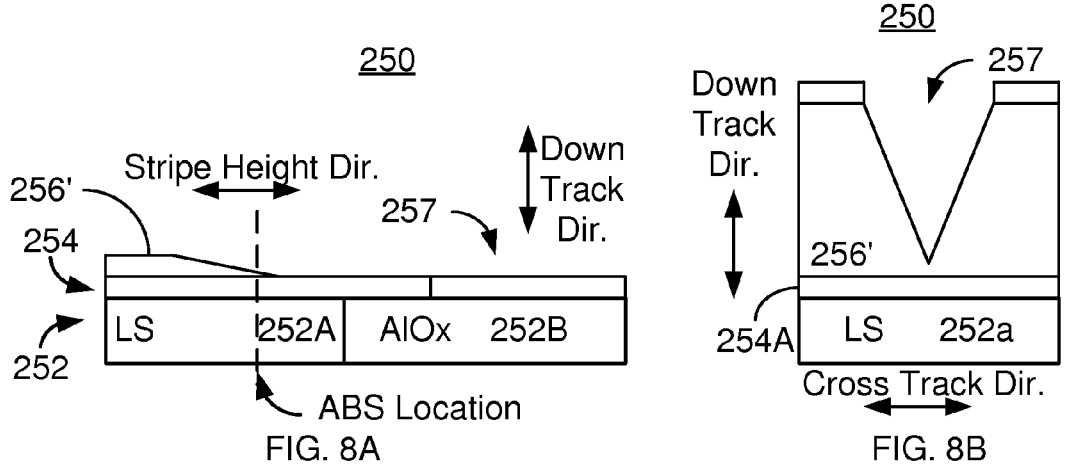
FIG. 8A
FIG. 8B

US 9,508,363 B1

METHOD FOR FABRICATING A MAGNETIC WRITE POLE HAVING A LEADING EDGE BEVEL

BACKGROUND

FIG. 1 depicts a conventional method 10 for fabricating a conventional magnetic recording head. FIGS. 2A-2E depict side (apex) views of a conventional transducer 50 during formation using the method 10. An underlayer having a sloped surface at the air-bearing surface (ABS) location is provided, via step 12. The ABS location is the area that will form the ABS once the slider has been lapped and fabrication is completed. Typically, this includes multiple deposition and etch or milling steps in order to provide the sloped surface. An etch stop layer is deposited on the underlayer, via step 14. FIG. 2A depicts the conventional transducer 50 after step 14 has been provided. Thus, underlayer 52 has been provided. The underlayer 52 includes a leading shield 52A. As can be seen in FIG. 2A, the upper surface of the leading shield 52A is sloped at and near the ABS location. An etch stop layer 54 has also been provided.

The aluminum oxide intermediate layer is conformally deposited, via step 16. FIG. 2B depicts the conventional transducer 50 after step 16 has been performed. Thus, the intermediate layer 56 has been provided. The top and bottom of the intermediate layer follow the slope in the etch stop layer 54 and underlayer 52. However, a flat top surface is desired to improve photolithography. Thus, the intermediate layer 56 is planarized, via step 18. FIG. 2C depicts the transducer 50 after step 18 has been performed. The top surface of the intermediate layer 56' is now flat, while the bottom surface remains sloped.

A trench has also been formed in the intermediate layer, for example using an aluminum oxide reactive ion etch (RIE), via step 20. Step 20 typically includes providing a mask having an aperture over the portions of the intermediate layer that are desired to be removed. The RIE is performed in the presence of the mask. The RIE proceeds until the etch stop layer 54 is reached. Thus, FIG. 2D depicts an apex view of the transducer after step 20 is performed. At this location, therefore, the intermediate layer 56 has been removed and the etch stop layer 54 exposed. However, in other regions, some or all of the intermediate layer 56' remains.

A nonmagnetic seed layer for electroplating is provided, via step 22. For example Ru or another conductive material may be deposited via chemical vapor deposition (CVD), sputtering, or some other method. The main pole is then provided, via step 24. Step 24 typically includes plating high saturation magnetization pole materials, planarizing these material(s) using a chemical mechanical planarization (CMP) and forming a trailing (top) bevel, if any. For example, CoFe may be plated in step 12. Because of the profiles of the underlayer 52, etch stop layer 54, the intermediate layer 56 and trench, a leading edge bevel may be formed in the electroplated materials. FIG. 2E depicts the transducer 50 after step 24 is performed. Thus, the pole 60 has been fabricated. In this embodiment, a trailing edge bevel may, or may not, be formed. The pole 60 is shown without a trailing edge bevel. However, the pole has a leading bevel 62 due to the slopes of the leading shield 52A, etch stop layer 54, intermediate layer 56' (not shown in FIG. 2E) and trench on which the pole 60 is formed.

Although the conventional magnetic recording head 50 formed using the method 10 functions, there are drawbacks. For example, formation of the leading bevel 62 may require multiple process steps. Fabrication times for the conventional transducer 50 may thus be longer. Yield for the method 10 may also be lower than desired. In addition, variations in the fabrication process may result in poorer performance of the conventional transducer 50. For example, the sidewalls of the pole 60 may have a different shape (angle) or location than designed. Accordingly, what is needed is a system and method for improving the performance of a magnetic recording head and manufacturing yield.

BRIEF DESCRIPTION OF SEVERAL VIEWS OF THE DRAWINGS

FIGS. 6A-6B through 13A-13B depict side (apex) an ABS views of an exemplary embodiment of a magnetic recording transducer during fabrication.

DETAILED DESCRIPTION OF THE PREFERRED EMBODIMENTS

Figure 1:
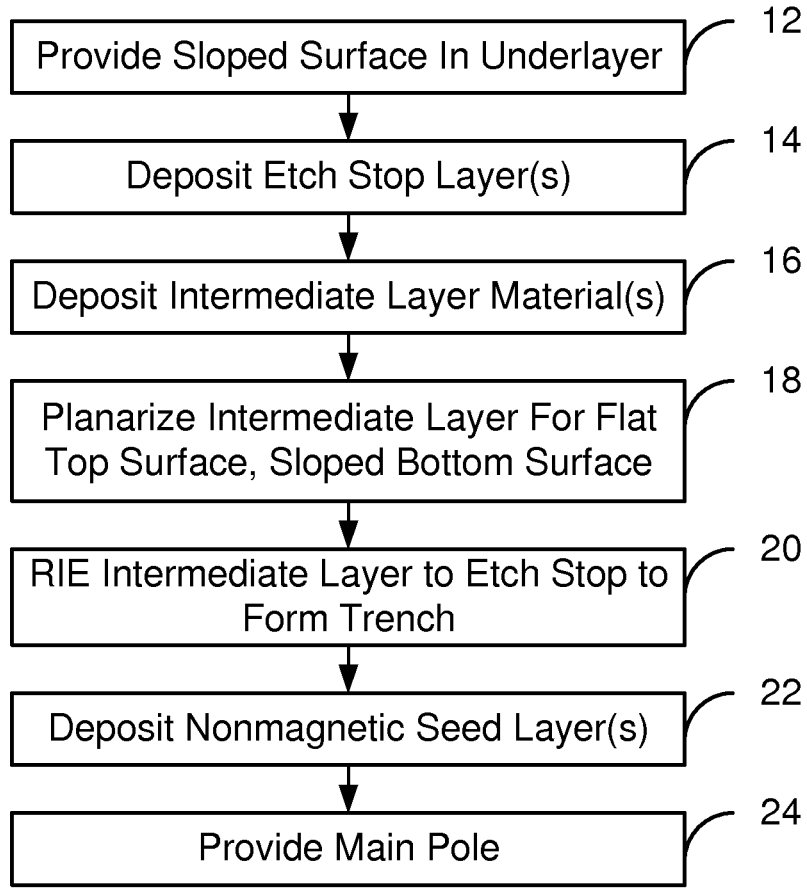
FIG. 1 is a flow chart depicting a conventional method for fabricating a pole in a magnetic recording transducer.
Figure 2A:
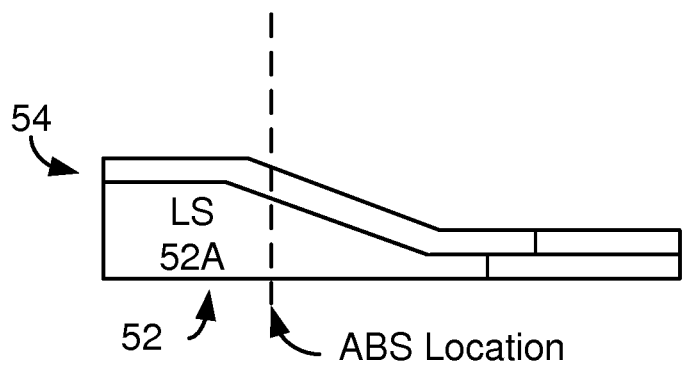
FIGS. 2A-2E depicts apex views of a conventional magnetic recording head during fabrication.
Figure 2B:
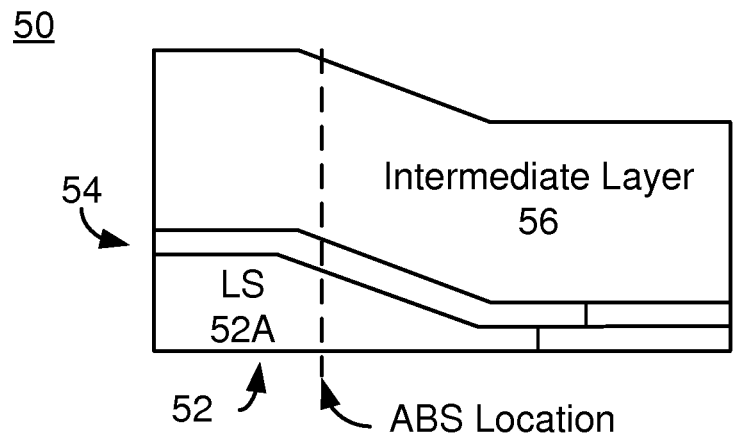
Figure 2C:
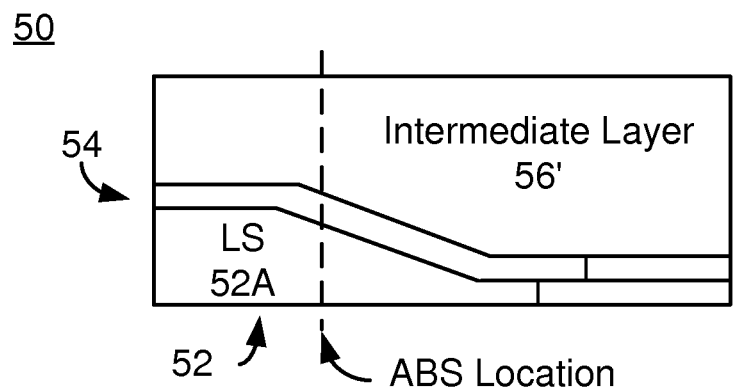
Figure 2D:
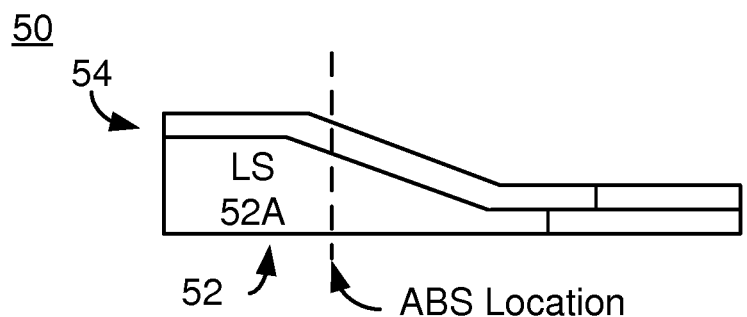
Figure 2E:
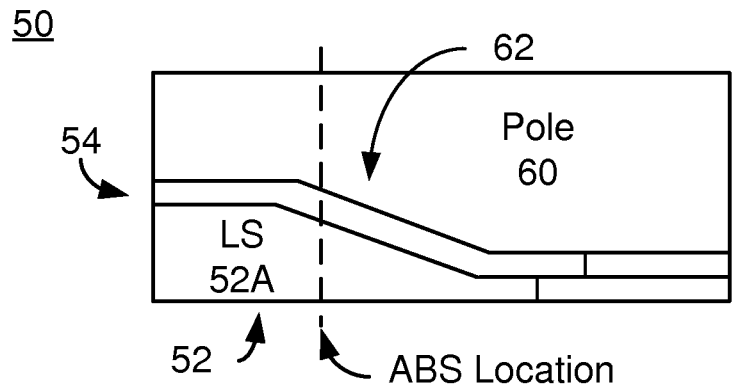
Figure 3:
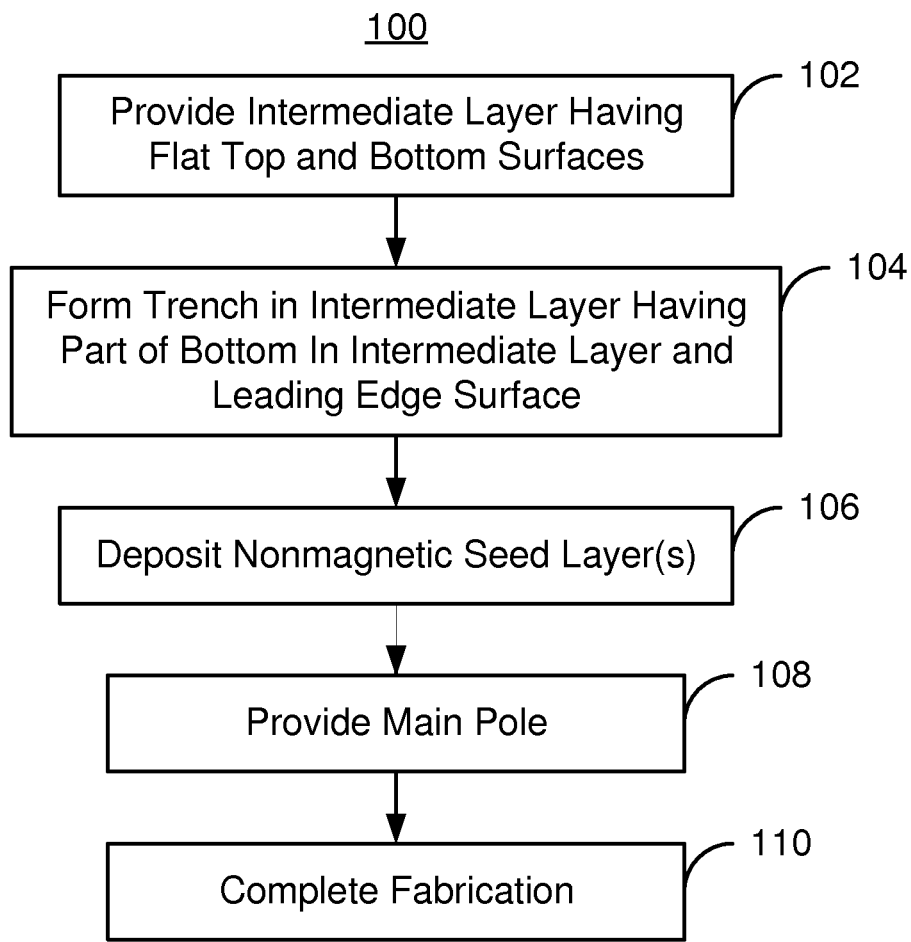
FIG. 3 depicts an exemplary embodiment of a method for providing a magnetic recording transducer.
Figure 4A:
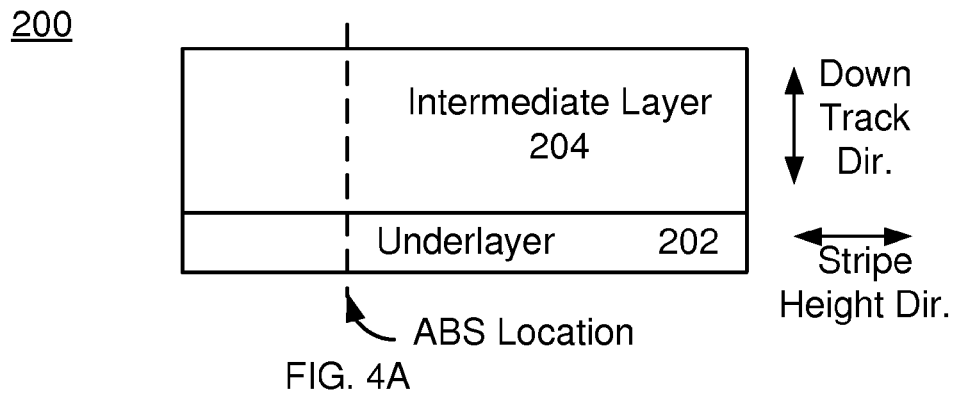
FIGS. 4A-4G depict an exemplary embodiment of a magnetic recording disk drive during fabrication.
Figure 4B:
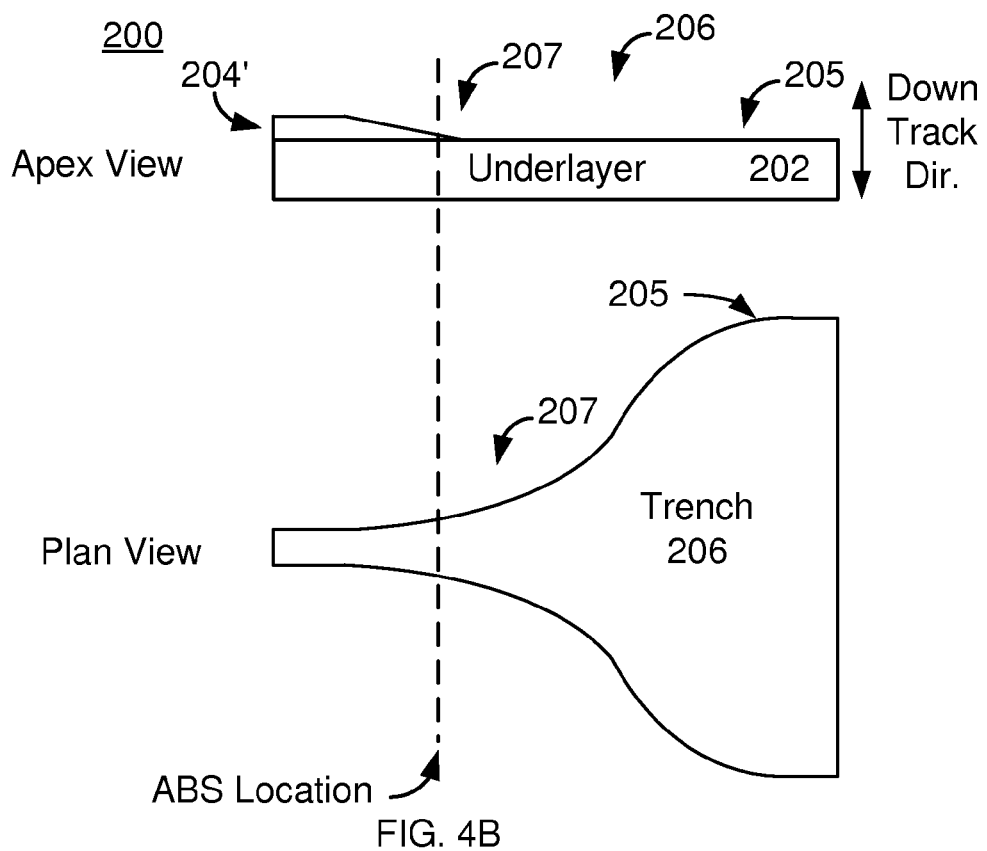
Figure 4C:
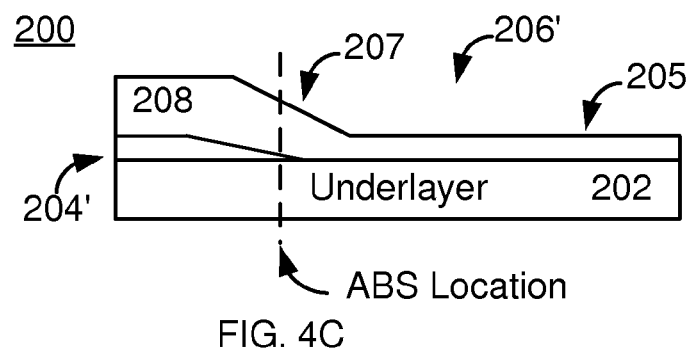
Figure 4D:
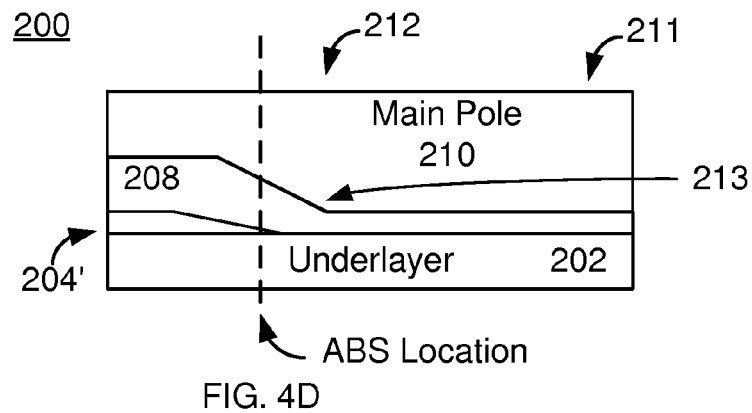
Figure 4E:
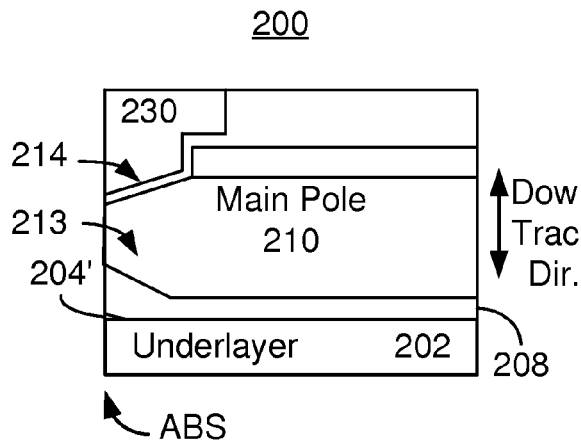

FIG. 3 depicts an exemplary embodiment of a method 100 for providing a magnetic recording transducer. For simplicity, some steps may be omitted, interleaved, combined, have multiple substeps and/or performed in another order unless otherwise specified. FIGS. 4A-4E depict an exemplary embodiment of a transducer 200 during fabrication using the method 100. Referring to FIGS. 3-4E, the method 100 is described in the context of providing a magnetic recording disk drive and transducer 200. The method 100 may be used to fabricate multiple magnetic recording heads at substantially the same time. The method 100 may also be used to fabricate other magnetic recording transducers. The method 100 is also described in the context of particular layers. A particular layer may include multiple materials and/or multiple sub-layers. The method 100 also may start after formation of other portions of the magnetic recording transducer. For example, the method 100 may start after a read transducer, return pole/shield and/or other structure have been fabricated. For example, the method 100 may start after the underlying structures, including an underlayer, have been provided. The underlayer may include a leading shield. An etch stop layer may also have been provided. Both the underlayer and etch stop layer may be substantially flat. In other words, the top surfaces of the underlayer and etch stop layer may be substantially perpendicular to the ABS location.

An intermediate layer is provided on the underlayer, via step 102. In some embodiments, the intermediate layer is also on the etch stop layer discussed above. The bottom (leading) surface of the intermediate layer is substantially flat because the underlayer is substantially flat. This geometry may be obtained simply by depositing the intermediate layer on the underlying topology. No additional processing of the intermediate layer may be required. FIG. 4A depicts an apex view of the transducer 200 after step 102 is performed. Thus, the underlayer 202 and intermediate layer 204 are shown. The intermediate layer 204 may be aluminum oxide or another wet etchable and/or reactive ion etchable (RIEable) layer. Also shown is the ABS location. As can be seen in FIG. 4A, the bottom and top of the intermediate layer 204 are perpendicular to the ABS location. The intermediate layer 204 has bottom and top surfaces that are substantially parallel to the stripe height direction. Thus, the bottom and top surfaces of the intermediate layer are substantially flat.

A trench is formed in the intermediate layer, via step 104. In some embodiments, step 102 includes performing one or more reactive ion etches (RIEs). The trench has a shape and location that corresponds to a main pole. FIG. 4B depicts an apex view and a plan view of the transducer 200 after step 104 is performed. A trench 206 has thus been formed. Because the apex location is shown, most of the intermediate layer has been removed. Only a small portion 204' of the intermediate layer remains. Because the shape of the trench 206 corresponds to that of the main pole, the top of the trench 206 may be wider than the bottom in the cross-track direction (perpendicular to the plane of the page in FIG. 4B). In addition, the trench 207 has a pole tip portion 207 at and near the ABS location and a yoke region 205 recessed from the ABS location. The pole tip portion 207 of the trench is narrower in the cross-track direction than the yoke region 205. Consequently, the depth of the trench varies. In particular, the depth of the trench 206 increases where the trench is wider (in the yoke region), while the sidewalls angles of the trench do not vary significantly. The depth of the trench 206 is in the down track direction. At the ABS location, a portion of the intermediate layer 204' remains. Further into the pole tip region 207, recessed from the ABS location, the intermediate layer 204' thins. In the yoke region 205 of the trench 206, the intermediate layer 204' has been completely removed. Thus, the bottom of the trench 206 is formed by part of the intermediate layer 204' in at least the ABS location. In the yoke region 205, however, the bottom of the trench 206 is formed by another layer, such as the underlayer 202 or an etch stop layer (not shown). In other words, the etch performed in step 104 terminates within the intermediate layer 204 at the ABS location and at least part of the pole tip region 207. In contrast, the etch performed in step 104 terminates on a layer under the intermediate layer 204 in the yoke region 205. Further, in some embodiments, the depth of the trench increases monotonically in the pole tip region 207. In the embodiment shown, the depth increases smoothly and linearly. However, in another embodiment, the trench depth may increase in another manner.

A nonmagnetic seed layer is deposited, via step 106. For example, step 106 may include depositing a Ru layer using CVD or another conformal deposition method. FIG. 4C depicts an apex view of the transducer 200 after step 106 is performed. Thus, a nonmagnetic seed layer 208 is shown. The nonmagnetic layer 208 resides at least in the trench 206. The nonmagnetic layer fills a portion of the trench in the pole tip region 207 faster than in the yoke region 205. This is not only because of the presence of the intermediate layer 204' but also because the trench 206 is narrower in the pole tip region 207. Thus, a remaining portion of the trench 206' is shallower at the ABS location than in the yoke region 205. Stated differently, if the thickness of the nonmagnetic layer 208 is t in the yoke region 205, then the remaining portion of the trench 206' is shallower by greater than t at the ABS location. The remaining, open portion of the trench 206' monotonically increases in depth. In the embodiment shown, the depth of the remaining portion of the trench 206' increases smoothly and linearly. However, in another embodiment, the trench depth may increase in another manner.

A main pole is provided in the trench, via step 108. In some embodiments, step 108 may include electroplating one or more layers. Other deposition methods may be used in addition to or in lieu of plating. The main pole material(s) have a high saturation magnetization and thus may include material(s) such as CoFe. Step 108 may also include forming a trailing bevel. FIG. 4D depicts an apex view of the transducer 200 after fabrication of the main pole 210. Thus, the main pole 210 includes a pole tip portion 212 and a yoke portion 211. The main pole 210 also has a leading bevel 213.

Figure 4F:
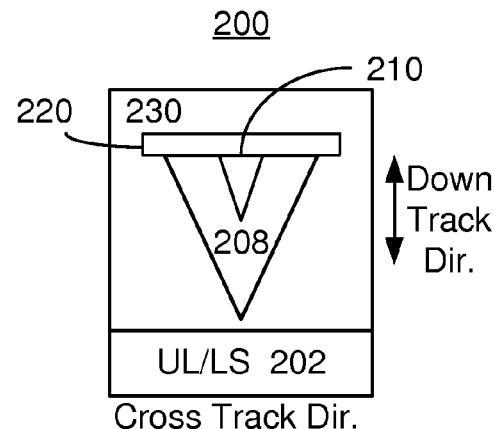
Figure 4G:
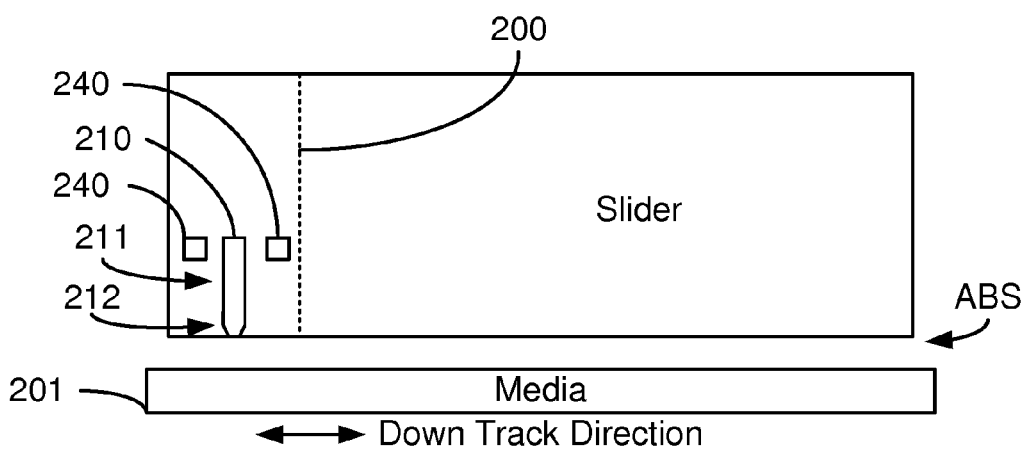

Fabrication of the transducer may then be completed, via step 110. For example, coils, shields, contacts, insulating structures and other components may be provided. In addition, the slider may be lapped and otherwise completed. FIGS. 4E, 4F and 4G depict an apex view of the transducer 200, an ABS view of the transducer 200 and a side view of a disk drive including the transducer 200. Thus, a media 201, shield 230 and coils 240 are shown. As can be seen in FIG. 4E, a trailing bevel 214 has been fabricated in the pole tip region 212 (not labeled in FIG. 4E). Note that although a PMR transducer 200 is shown, in other embodiments, the method 100 may be used in fabricating a pole for a heat assisted magnetic recording (HAMR) or other write transducer.

Using the method 100, a magnetic transducer having improved performance may be fabricated. The method 100 forms the leading bevel 213 without complicated processing steps. Instead, the shape of the trench 206, intermediate layer 204' and nonmagnetic layer 208 naturally result in formation of the leading bevel 213. Reduction in complexity of formation in the leading bevel 213 may improve fabrication time and yield. Further, it is posited that because formation of the trench 206 terminates within the intermediate layer 204' in step 104, the variation in the width of the trench may be reduced over the conventional method, which terminates at the underlying etch stop layer. Thus, performance and/or yield may be improved. In addition, the geometry of the pole tip 212 is not adversely affected by use of the method 100. It is noted that any leading shield that is part of the underlayer 202 may be further spaced apart from the pole tip 212 by the nonmagnetic layer 208. However, it is believed that this does not significantly or adversely affect performance. Thus, performance and yield may be improved while fabrication is simplified using the method 100.

Figure 5:
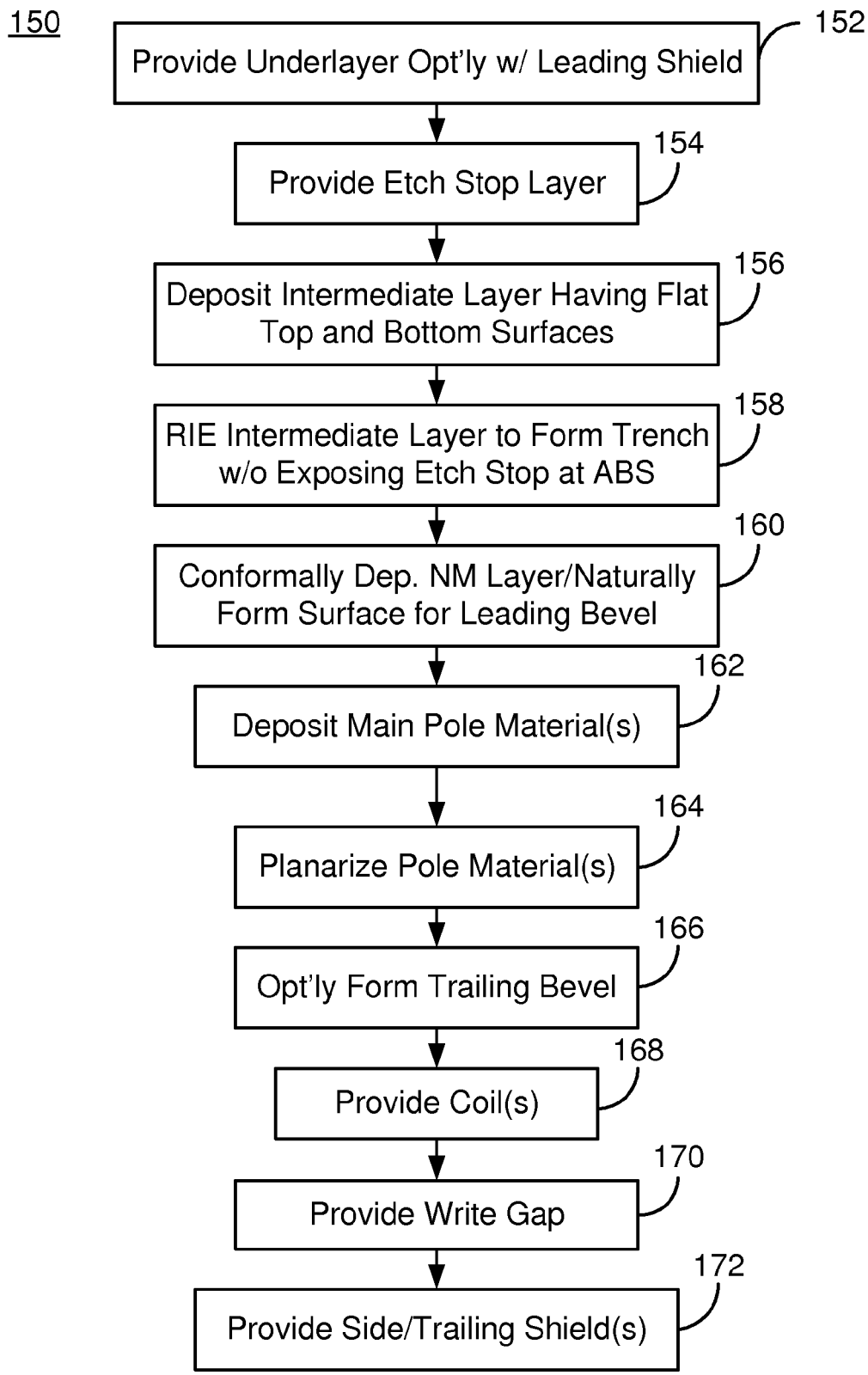
FIG. 5 depicts another exemplary embodiment of a method for providing a magnetic recording transducer.
Figure 12A:
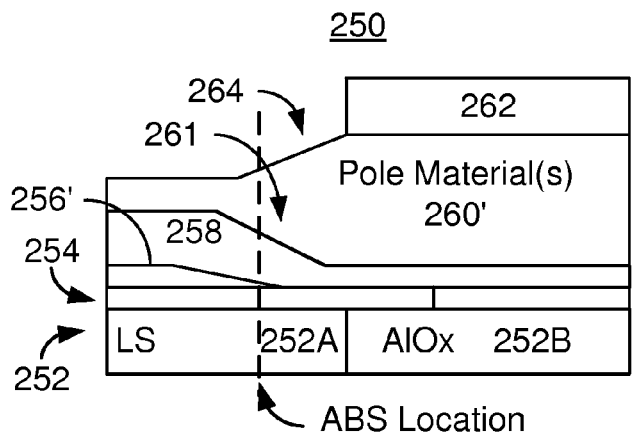
Figure 12B:
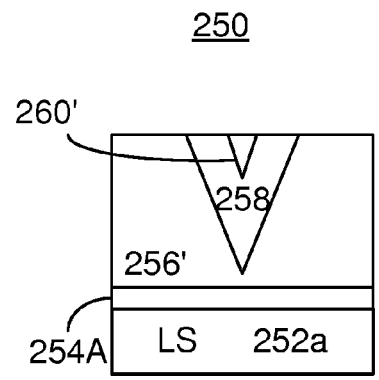
Figure 13A:
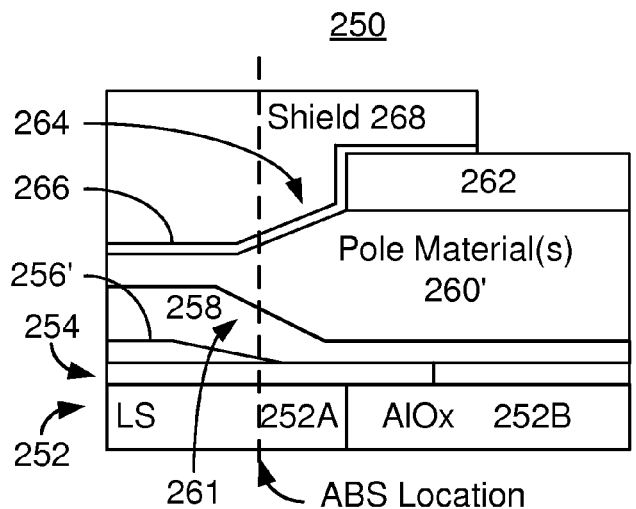
Figure 13B:
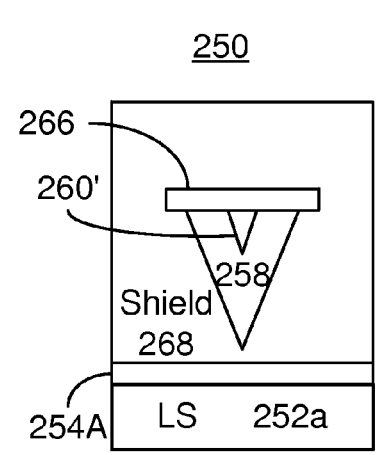

FIG. 5 depicts an exemplary embodiment of a method 150 for providing a magnetic recording transducer having a leading edge bevel. For simplicity, some steps may be omitted, interleaved, performed in another order and/or combined. FIGS. 6A-6B though FIGS. 13A-13B depict an exemplary embodiment of a transducer 250 during fabrication using the method 150. Referring to FIGS. 5-13B, the method 150 may be used to fabricate multiple magnetic recording heads at substantially the same time. The method 150 may also be used to fabricate other magnetic recording transducers. The method 150 is also described in the context of particular layers. A particular layer may include multiple materials and/or multiple sub-layers. The method 150 also may start after formation of other portions of the magnetic recording transducer. For example, the method 150 may start after a read transducer, return pole/shield and/or other structure have been fabricated.

An underlayer that is substantially flat is provided, via step 152. Step 152 may include forming a leading shield in the underlayer. However, in contrast to the underlayer for the conventional transducer 50 the top surface of the leading shield may be substantially perpendicular to the ABS location.

An etch stop layer is provided on the underlayer, via step 154. The etch stop layer may include multiple sublayers. Alternatively, multiple etch stop layer may be considered to be provided. The top surface of the etch stop layer(s) is substantially flat. FIGS. 6A and 6B depict apex and ABS views, respectively, of the transducer 250 after step 154 has been performed. Thus, an underlayer 252 is shown. The underlayer 252 includes a leading shield 252A that may be formed of NiFe. A remaining portion of the underlayer 252B is nonmagnetic. In the embodiment shown, the portion of the underlayer 252B is aluminum oxide. The etch stop layer 254 is also shown. The etch stop layer 254 includes a NiFe layer 254A and a Ru layer 254B. In other embodiments, other layer(s) and/or material(s) may be used. The top surfaces of the underlayer 252 and etch stop layer 254 are substantially flat and, therefore, perpendicular to the ABS location. Thus, the top surfaces of the layers 252 and 254 are parallel to the stripe height and cross-track directions.

An intermediate layer is full film deposited on the etch stop 254, via step 106. In some embodiments, the intermediate layer is an aluminum oxide layer. FIGS. 7A and 7B depict apex and ABS views, respectively, of the transducer 250 after step 106 is performed. Thus, the intermediate layer 256 is shown. The bottom (leading) surface of the intermediate layer 256 is substantially flat because the underlayer 252 and etch stop layer 254 are substantially flat. Thus, as can be seen the top and bottom surfaces of the intermediate layer 256 are parallel to the stripe height and cross track directions. This geometry may be obtained simply by depositing the intermediate layer on the underlying topology. No additional processing of the intermediate layer may be required. Note that in other embodiments, the top surface of the intermediate layer 256 may not be flat. However, it is believed that in such embodiments subsequent processing, for example photolithography, may be adversely affected by such a top surface.

One or more RIEs are performed to remove a portion of the intermediate layer 256 and form a trench therein, via step 158. Step 158 may include forming a mask having an aperture corresponding to the location and footprint of the trench. Further, the RIE(s) performed in step 158 terminate within the intermediate layer 256 at and near the ABS location. However, the etch(es) terminate at the etch stop layer 254 in the yoke region. Thus, the depth of the trench formed in the intermediate layer varies at least in part because the width of the trench varies. FIGS. 8A and 8B depict apex and ABS views of the transducer 250 after step 158 is performed. Thus, a trench 257 has been formed in the intermediate layer 256'. The bottom of the trench is 257 formed by the intermediate layer 256' at and near the ABS location. Stated differently, a portion of the intermediate layer 256' lies between the bottom of the trench 257 and the etch stop layer 254 and underlayer 252. Because the etch is terminated in the intermediate layer 257 at and near the ABS location, the trench 257 may have a triangular shape at the ABS location. In the yoke, however, the trench is wider and deeper. The etch that forms the trench 257 may also terminate on or in the etch stop layer 254. Further, because the bottom of the trench may be on the etch stop layer 254 in the yoke region, the trench 257 may be trapezoidal in cross section instead of triangular. Further, in some embodiments, the depth of the trench 257 increases monotonically in the pole tip region. In the embodiment shown, the depth increases smoothly and linearly. However, in another embodiment, the trench depth may increase in another manner.

Figure 9A:
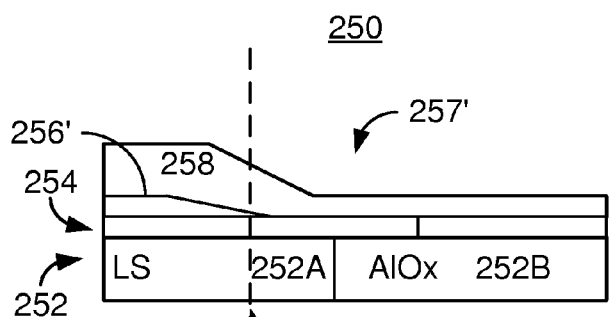
Figure 9B:
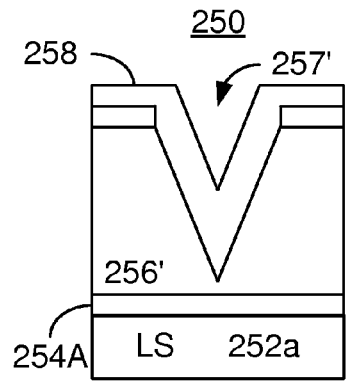

A seed layer that may be resistant to an etch of the intermediate layer 256' is deposited in the trench, via step 160. In some embodiments, a Ru layer is deposited in step 160. In other embodiments, a Ta or other layer may be deposited. In some embodiments, a multilayer seed layer may be provided in step 160. The deposition performed in step 160 is conformal. FIGS. 9A and 9B depict apex and ABS views of the transducer 250 after step 160 is performed. Thus, a seed layer 258 has been deposited. A remaining portion of the trench 257' remains open. The nonmagnetic layer 258 resides at least in the trench 257. The nonmagnetic layer fills a portion of the trench in the pole tip region faster than in the yoke region. This is not only because of the presence of the intermediate layer 254' but also because the trench 257 is narrower in the pole tip region than in the yoke region. Thus, a remaining portion of the trench 257' is shallower at the ABS location than in the yoke region 205. Stated differently, if the thickness of the nonmagnetic layer 258 is t in the yoke region, then the remaining portion of the trench 257' is shallower by greater than t (and in some embodiments at least 2t) at the ABS location. The remaining, open portion of the trench 257' monotonically increases in depth in the area around the ABS location. In the embodiment shown, the depth of the remaining portion of the trench 257' increases smoothly and linearly. However, in another embodiment, the trench depth may increase in another manner.

Figure 10A:
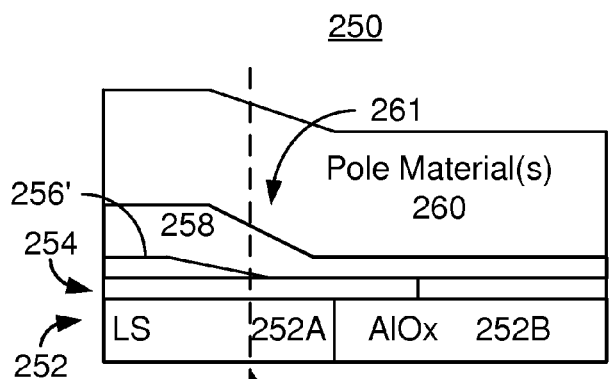
Figure 10B:
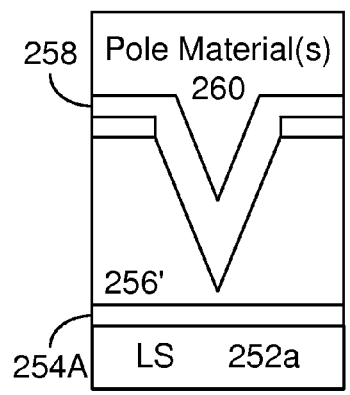

The main pole is provided using steps 162, 164 and, optionally, 166. The material(s) for the main pole are deposited, via step 162. In some embodiments, step 162 includes plating the pole materials. FIGS. 10A and 10B depict apex and ABS views of the transducer 250 after step 162 is performed. Thus, the pole material(s) 260 have been provided. The pole material(s) 260 may include a single material (e.g. an alloy), a multilayer or other structure(s). Because of the shape of the trench 257', nonmagnetic layer 258 and intermediate layer 256', the pole material(s) 260 have a leading bevel 261 adjoining the nonmagnetic layer 258.

Figure 11A:
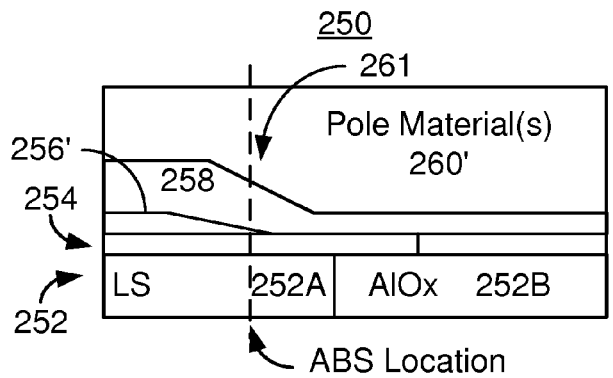
Figure 11B:
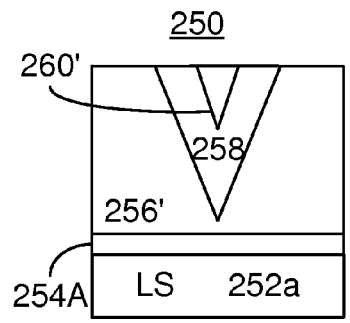

The main pole material(s) may be planarized, via step 164. Step 164 may utilize a chemical mechanical planarization. In addition, an ion mill may be performed to remove the mask and/or other material(s) outside of the trench. FIGS. 11A and 11B depict apex and ABS views of the transducer 250 after step 164 has been performed. The top of the pole material(s) 260' are thus substantially flat. In addition, the pole material(s) 260, seed layer 258 and mask outside of the trench (not labeled in FIGS. 11A-13B) have been removed. Thus, the remaining portion of the pole material(s) are in the trench.

A trailing bevel may optionally be formed, via step 166. Step 166 may include providing a nonmagnetic structure on the pole material(s) 260 that is recessed from the ABS location, then milling the pole material(s). FIGS. 12A and 12B depict apex and ABS view of the transducer 250 after step 166 has been performed. In the transducer 250, therefore, the pole 260' does include a trailing bevel 264. Also shown is nonmagnetic structure 262 that may be used in forming the trailing bevel 266. In some embodiments, step 166 may be interleaved with step(s) 168, 170 and/or 172.

The coil(s) that are used to energize the main pole 260' are provided, via step 168. Step 168 may include forming a helical or spiral coil. Thus, a portion of the coil(s) may be formed before the pole. Single or multiple layers of turns may also be formed. A write gap is formed, via step 170. The write gap lies on top of the main pole 260'. The shield(s) may be provided, via step 172. Step 172 may include providing side shields, a trailing shield, and/or a wraparound shield (which includes side and trailing shields). FIGS. 13A and 13B depict apex and ABS views of the transducer 250 after step 172 is performed. Thus, a write gap 266 and shield(s) 268 are shown. In the embodiment shown, the shield 268 is a wraparound shield. In some embodiments, other and/or different structures may be fabricated. Fabrication of the transducer may be completed. For example, the transducer 250 may be lapped to the ABS location and contacts and/or other structures may be provided.

Using the method 150, a main pole 260 having improved performance may be fabricated more simply and with higher yield. For example, the leading bevel 261 may be more simply and readily formed. This may improve fabrication time and yield. Further, the variation in the width main pole 260' at the ABS location may be reduced. Thus, performance and/or yield may be improved. In addition, the geometry of the pole tip for the pole 260' is not adversely affected by use of the method 100. It is noted that the leading shield 252A may be further spaced apart from the pole tip by the nonmagnetic layer 258. However, it is believed that this does not significantly or adversely affect performance. Thus, performance and yield may be improved while fabrication is simplified using the method 150.

We claim:

1. A method for fabricating magnetic transducer having air-bearing surface (ABS) location comprising:
   providing an intermediate layer having a substantially flat bottom surface that is substantially perpendicular to the ABS location;
   forming a trench in the intermediate layer, the trench having a bottom, a pole tip region and a yoke region, the yoke region of the trench being wider than the pole tip region in a cross-track direction, the cross track direction being parallel to the ABS location, the trench having a first depth in the yoke region in a down track direction, the down track direction being perpendicular to the cross track direction and parallel to the ABS location, the trench having a second depth in the down track direction at the ABS location in the pole tip region, the second depth being less than the first depth such that a portion of the intermediate layer is at the bottom of the trench at the ABS location;
   providing a nonmagnetic layer in at least the trench, the nonmagnetic layer filling a portion of the trench in the pole tip region such that a remaining portion of the trench has a third depth at the ABS location, the third depth being less than the second depth; and
   providing a main pole, at least a portion of the main pole residing in the trench, the main pole having a leading surface including a leading bevel in the portion of the pole tip region of the trench and the adjacent to nonmagnetic layer.

2. The method of claim 1 wherein the nonmagnetic layer has a thickness in the yoke region and fills the portion of the pole tip region of the trench such that the third depth is less than the second depth by more than the thickness.

3. The method of claim 1 wherein the transducer includes an underlayer, the method further comprising:
   providing an etch stop layer on the underlayer, the etch stop layer having a top surface substantially perpendicular to the ABS;
   wherein the intermediate layer is provided on the etch stop layer.

4. The method of claim 3 wherein the step of providing the trench further includes:
   removing a portion of the intermediate layer such that the bottom of the trench is at the etch stop layer in the yoke region and within the intermediate layer in the portion of the pole tip region.

5. The method of claim 3 wherein the step of providing the intermediate layer further includes full-film depositing an aluminum oxide layer.

6. The method of claim 3 wherein the underlayer includes a leading shield.

7. The method of claim 1 wherein the step of providing the main pole further includes:
   plating at least one magnetic material.

8. The method of claim 7 wherein the step of providing the main pole further includes:
   removing a portion of the main pole layer adjacent to the ABS location to provide a trailing bevel.

9. The method of claim 1 wherein the step of forming the trench further includes:
   reactive ion etching the intermediate layer.

10. The method of claim 9 further comprising:
    providing at least one shield.

11. The method of claim 1 further comprising:
    providing at least one coil.

12. The method of claim 1 wherein a trench depth monotonically increases from the second depth to the first depth in a direction perpendicular to the ABS.

* * * * *